US007742946B2

(12) United States Patent
Banks et al.

(10) Patent No.: US 7,742,946 B2
(45) Date of Patent: Jun. 22, 2010

(54) ADVERTISING SALES MANAGEMENT SYSTEM

(75) Inventors: Martin L Banks, Grass Valley, CA (US); Michael C. Colson, Fair Oaks, CA (US); David S. Hardy, Grass Valley, CA (US)

(73) Assignee: Visual Advertising Sales Technology, Auburn, CA (US)

( * ) Notice: Subject to any disclaimer, the term of this patent is extended or adjusted under 35 U.S.C. 154(b) by 2058 days.

(21) Appl. No.: 10/452,967

(22) Filed: Jun. 2, 2003

(65) Prior Publication Data

US 2003/0225629 A1 Dec. 4, 2003

Related U.S. Application Data

(60) Provisional application No. 60/385,484, filed on Jun. 3, 2002.

(51) Int. Cl.
*G06Q 30/00* (2006.01)
(52) U.S. Cl. .................. 705/26; 705/37; 705/14.1
(58) Field of Classification Search .................. 705/26, 705/37
See application file for complete search history.

(56) References Cited

U.S. PATENT DOCUMENTS 5,740,549 A 4/1998 Reilly et al. ............... 705/14

| 6,985,882 | B1* | 1/2006 | Del Sesto | 705/37 |
| 7,331,057 | B2* | 2/2008 | Eldering et al. | 725/32 |
| 2002/0053078 | A1 | 5/2002 | Holtz et al. | 725/14 |
| 2002/0184047 | A1* | 12/2002 | Plotnick et al. | 705/1 |
| 2003/0004793 | A1* | 1/2003 | Feuer et al. | 705/14 |

OTHER PUBLICATIONS

Whitney, Daisy, Optimizing Inventory, TelevisionWeek, May 17, 2004, v23n20 pp. 23, 3 pages, downloaded from Dialog Web on Apr. 27, 2008.*
Carl Lindemann, "Ready, aim, stream", Broadcasting & Cable. New York: Jun 18, 2001. vol. 131, Iss. 26; p. 50, downloaded from ProQuestDIrect on the Internet on Feb. 17, 2009, 2 pages.*
Stuart Thomson, Ad and Divide, Cable & Satellite Europe. London: Apr 2001. , Iss. 208; p. 1, downloaded from ProQuestDIrect on the Internet on Feb. 17, 2009, 15 pages.*

* cited by examiner

*Primary Examiner*—James Zurita
(74) *Attorney, Agent, or Firm*—Michael S. Neustel

(57) ABSTRACT

A system for providing an interface that allows access to system used to sell time slots for advertisements in broadcast programming. This system allows a user to access databases to access information needed to sell the advertisements. The system integrates the databases to allow easy access and centralized storage of all needed information for selling time slots for advertisements in broadcast programming.

42 Claims, 13 Drawing Sheets

ADVERTISING SALES MANAGEMENT SYSTEM

CROSS RELATED REFERENCES

Figure 1:
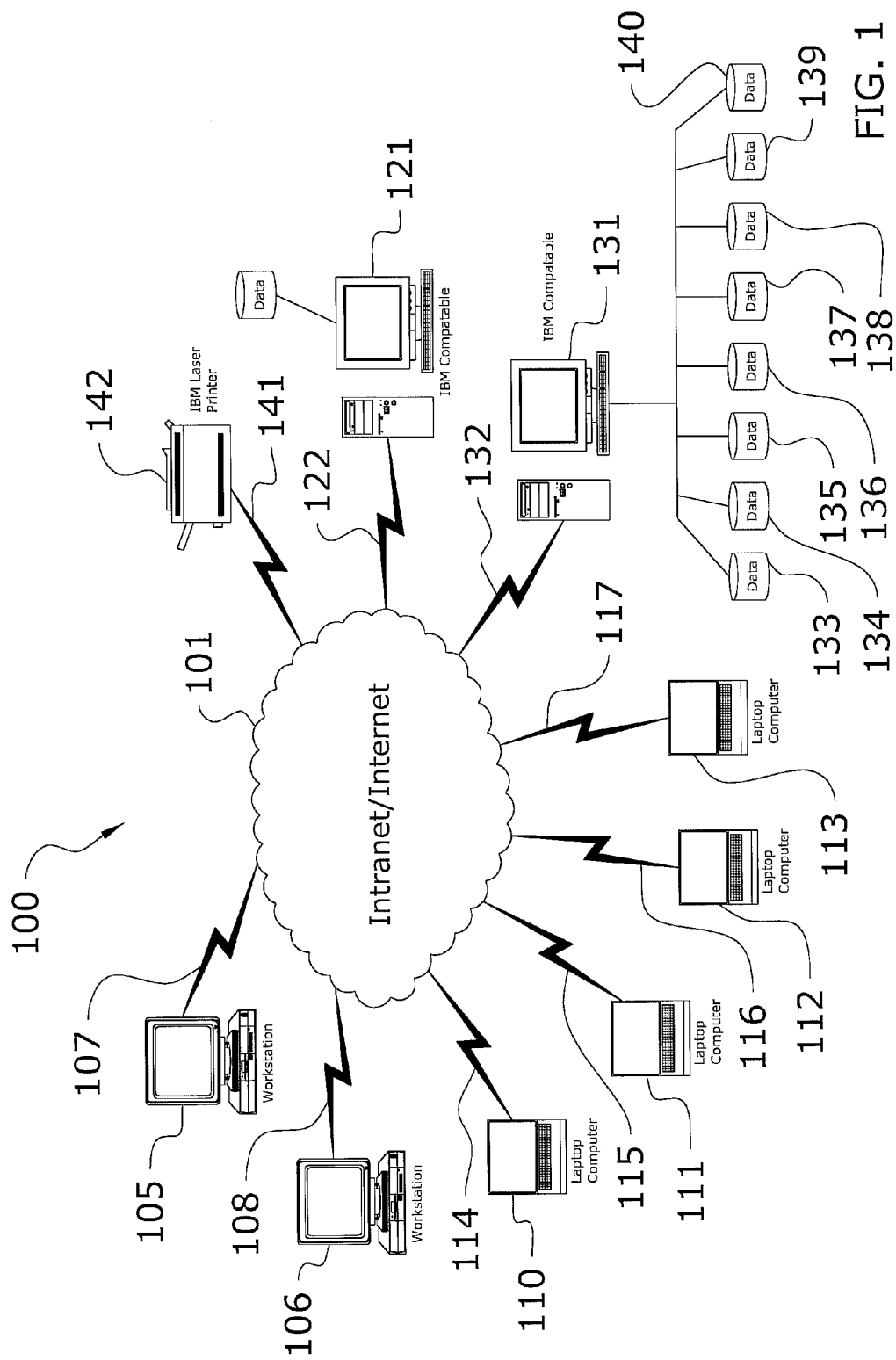

This application claims priority to Provisional Patent Application No. 60/385,484 filed on Jun. 3, 2002.

BACKGROUND OF THE INVENTION

1. Field of the Invention

The present invention relates to a system for managing sales of advertisements for a broadcast media. More particularly, this invention relates a system that provides an interface between databases that provide programming and advertising information. Still more particularly, this invention relates to providing an interface between the various databases containing information needed for selling advertising over a media.

2. The Prior Art

In today's society, there are many forms of broadcast media. Some examples of broadcast media include, but are not limited, television, radio, and the Internet. Typically, the broadcasts are of scheduled programs, which may include shows, or other scheduled events. One means of generating revenues for broadcasters is by selling advertising over the media during the scheduled programming. Advertising is typically sold in time slots during which an advertiser may place an advertisement or commercial for goods or services provided by advertiser during a broadcast. The time slots are typically five seconds, ten seconds, fifteen seconds, twenty seconds, thirty seconds or a minute.

The time slots are usually sold based on the programming content and the time the programming is broadcast. The prices of the advertisements typically vary based on the program content, time of broadcast and the broadcast area. For example, a time slot during a national television broadcast of the Super Bowl is significantly more than a time slot during a late night movie broadcast by a local television station over a cable television system. Hence, one typically sees advertisements from large, nationwide advertisers during the Super Bowl and advertisements for smaller, regional or local advertisers during the late night movie on the local television station broadcast over a cable television system or broadcast network affiliates.

In order to sell the timeslots, broadcasters maintain an advertising sales department. The advertising sales department may be part of a broadcaster's organization or an outside firm hired to sell the advertising. Salespeople that sell the time slots are typically called Account Executives.

In order to sell the time slots, an Account Executive typically relies on multiple software applications to implement business systems needed to process the information needed to sell the time slots. For example, one application may be a database for storing programming content, a second application may be a database of ratings for programs, a third application may be a database of special offers or promotions provided by the broadcaster, a fourth application may be a database for advertisements to be inserted into broadcast programs. Other applications may include, but are not limited to, a client database storing client information, and a billing database storing billing information for sold time slots sold to clients.

Since multiple systems are used, there is often a duplication of inputting data into the separate systems. This duplication of inputs often causes mistakes in the inputs and adds additional time to the process. Furthermore, the Account Executive must have several applications operating at the same time in order to access the information. This can be quite confusing changing between applications to find the desired information.

A further problem is that a lot of systems that the Account Executives use rely on paper transactions. Typically, the Account Executives rely on a purchase order contract that is signed by a customer to sell a time slot. This purchase order must be produced manually and input into the system manually. This allows mistakes to be made while the paper transaction is generated and processed.

The above-identified problems are compounded for broadcasters that sell advertisements for many different stations or channels broadcasting in an area. One example of a broadcaster that sells advertisements for many different stations or channels is a local cable television company. Cable television is a common broadcast medium in which a local cable television company transmits programming for different stations over wiring connecting the local cable company office to subscribers.

The local cable company may sell advertisements for broadcast programs on each television channel the cable company broadcasts and different regions to which the company broadcasts. Since the cable company may have many different broadcast channels and many different regions that may receive the broadcasts, an advertiser has many choices of programs to by advertisement during the broadcast. Thus, there is need in the art for a system that would integrate the various systems used by an advertising sales department to sell advertisements for broadcast programs.

BRIEF DESCRIPTION OF THE INVENTION

This patent discloses and claims a useful, novel, and unobvious invention for an automated advertisement sales system in the broadcast media field. A first advantage of this invention is that an interface is provided that allows an Account Executive to retrieve information from separate system using one interface. A second advantage of this invention is that many processes may now be completed electronically, which reduces redundant data entry and mistakes made by multiple manual inputs. A third advantage is that clients may be automatically contacted with specific event information relevant to a business, special sales, and timeslot openings. A fourth advantage is that a client may respond electronically to Account Executives to order time slots.

The above advantages of this invention are provided by a system in accordance with this invention. The system of this invention includes processing units that maintain a programming database, a demographics database, a client database, an inventory database, and a billing system database. In accordance with this invention, a processing unit that is connected to processing or computer systems providing the databases provides an interface for accessing the databases.

In accordance with this invention, the interface may provide messages to an Account Executive that are generated by the system. The messages may include promotions, or programming that may appeal to an Account Executive's clients. In order to retrieve the messages, the Account Executive selects the message option. The interface then requests and receives user information from the Account Executive. The interface then verifies the user information and retrieves the message to display to the Account Executive.

In accordance with this invention, the interface also allows an Account Executive to access a client database. The interface may restrict access to a client record to only Account Executives that are authorized for access to a particular client record. The interface also allows an Account Executive to input new client records and to update existing client records. The interface may also read the client record and use information in the client record to generate a list of promotions or timeslots in event programming that may interest a client. A message including the list of promotions and time slots in event programming may then be transmitted to the client in a message such as an e-mail.

The interface of this invention may also receive and process order for time slots. The interface receives a request for an order and determines if the time slot is available. If the time slot is available, the interface then determines whether the transaction is approved. The approval may come from a supervisor or from the billing system. After approval, the interface generates a purchase order for the client and updates a billing record to charge for the time slot. The interface may then retrieve a client advertisement or commercial stored in a database and add the advertisement to broadcast data in the timeslot.

The interface also allows an Account Executive to access the programming, demographic and promotion databases. The interface receives a request for a search of a particular one of the databases. The interface then request search criteria. For example, this may be programming in a particular timeslot or a particular type of programming from the programming database. The interface then searches the records in the database for records that include information matching the criteria. The interface then generates a display from the records matching the search criteria.

The interface may also provide access to a billing database. In the billing database, a request to bill for a time slot may be received. In response to receiving a request, the billing system determines whether a client is authorized for credit. If the client is authorized for credit, the system updates the client's account with a debit. Otherwise, pre-payment is requested. Once the pre-payment is received, the account is updated.

The interface may also produce purchase orders for timeslots purchased by a client. The interface produces the purchase order in the following manner. First, the interface receives the client name. The record in the client database for the client is accessed. The interface then takes the information in the client record and inserts the information into appropriate fields in a purchase order form. The interface then receives time slot information for the order and inserts the time slot information into the appropriate fields of the purchase order. The purchase order may then be printed or electronically delivered to client.

BRIEF DESCRIPTION OF THE DRAWING FIGURES

Figure 2:
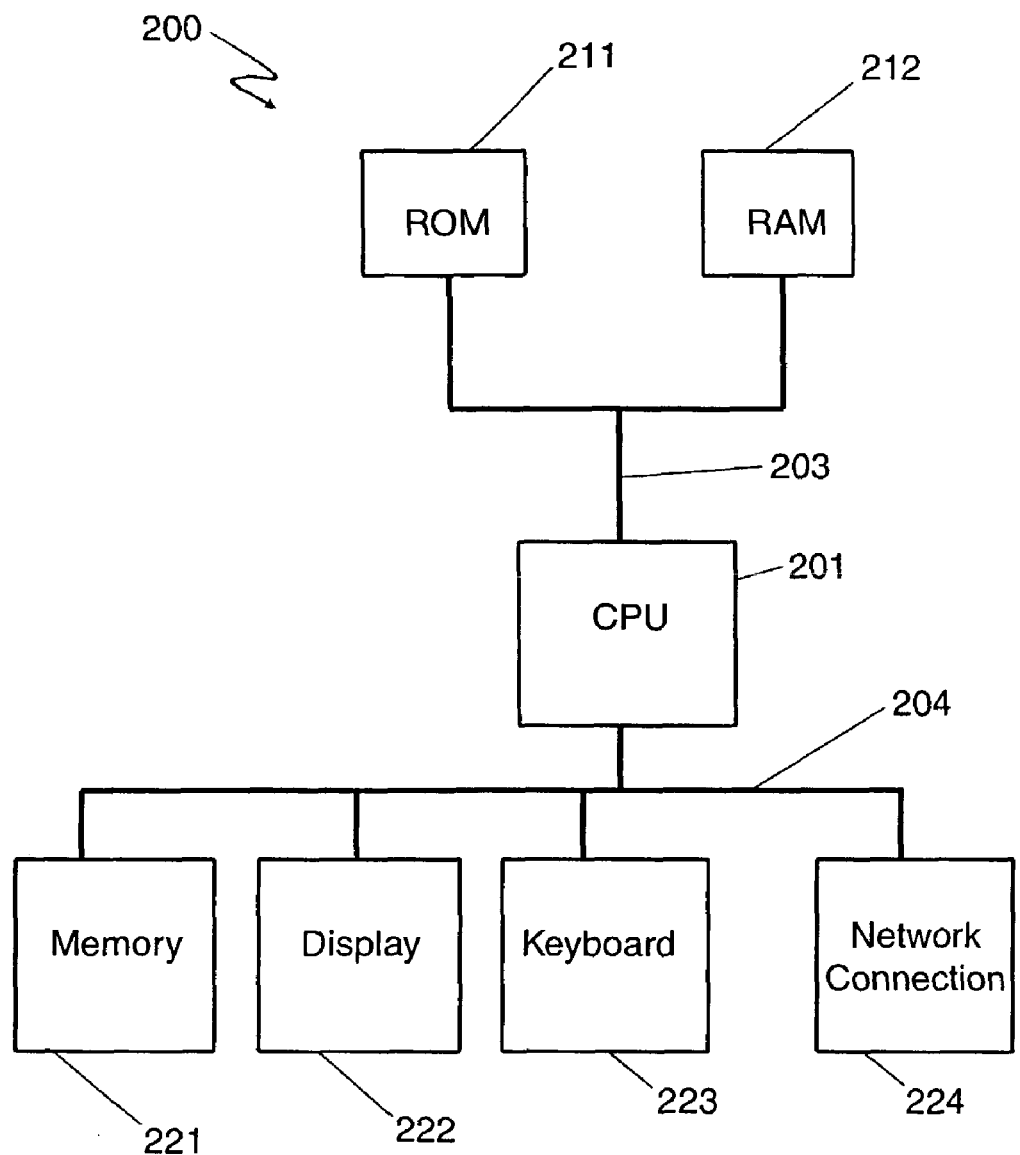
Figure 3:
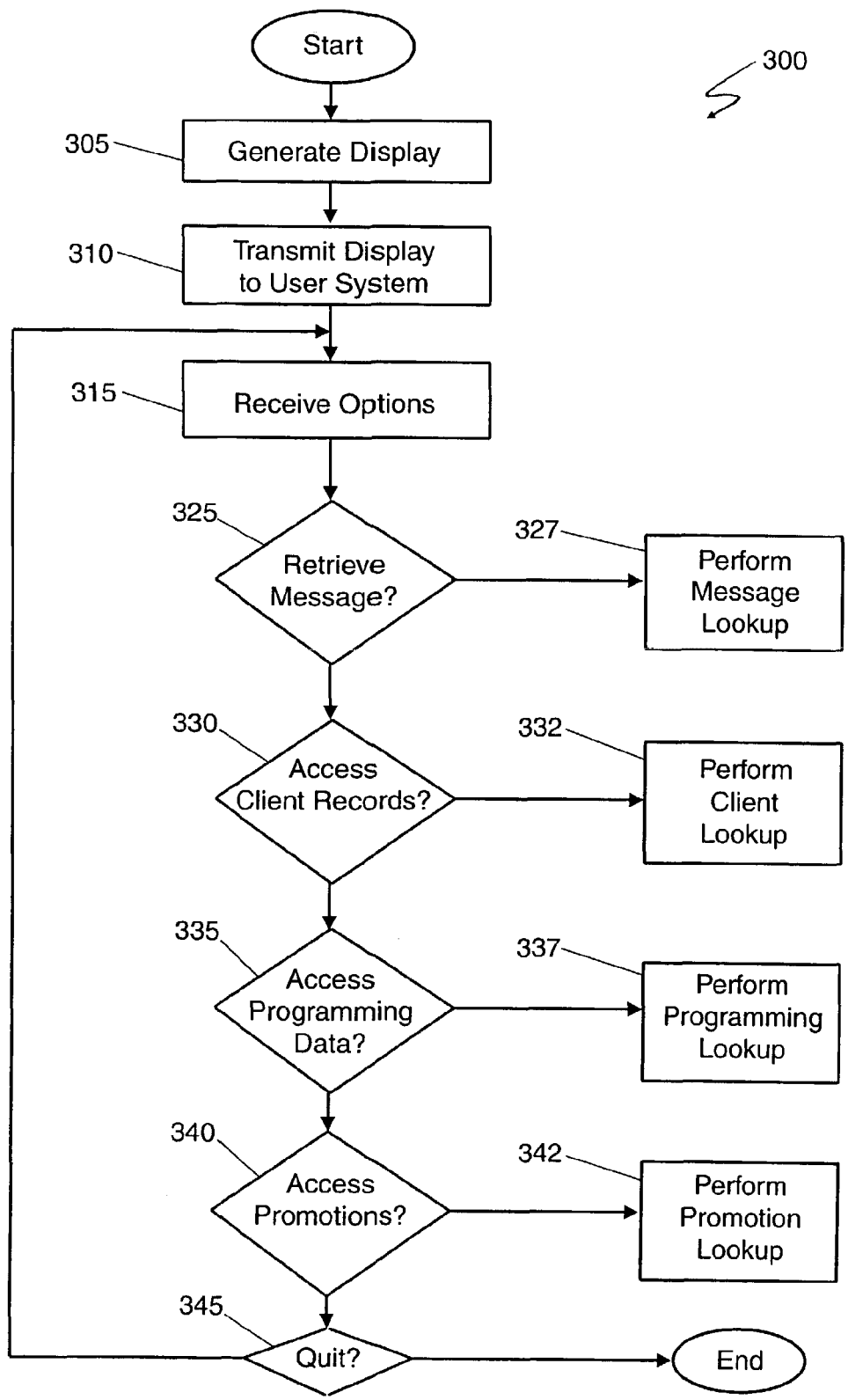
Figure 4:
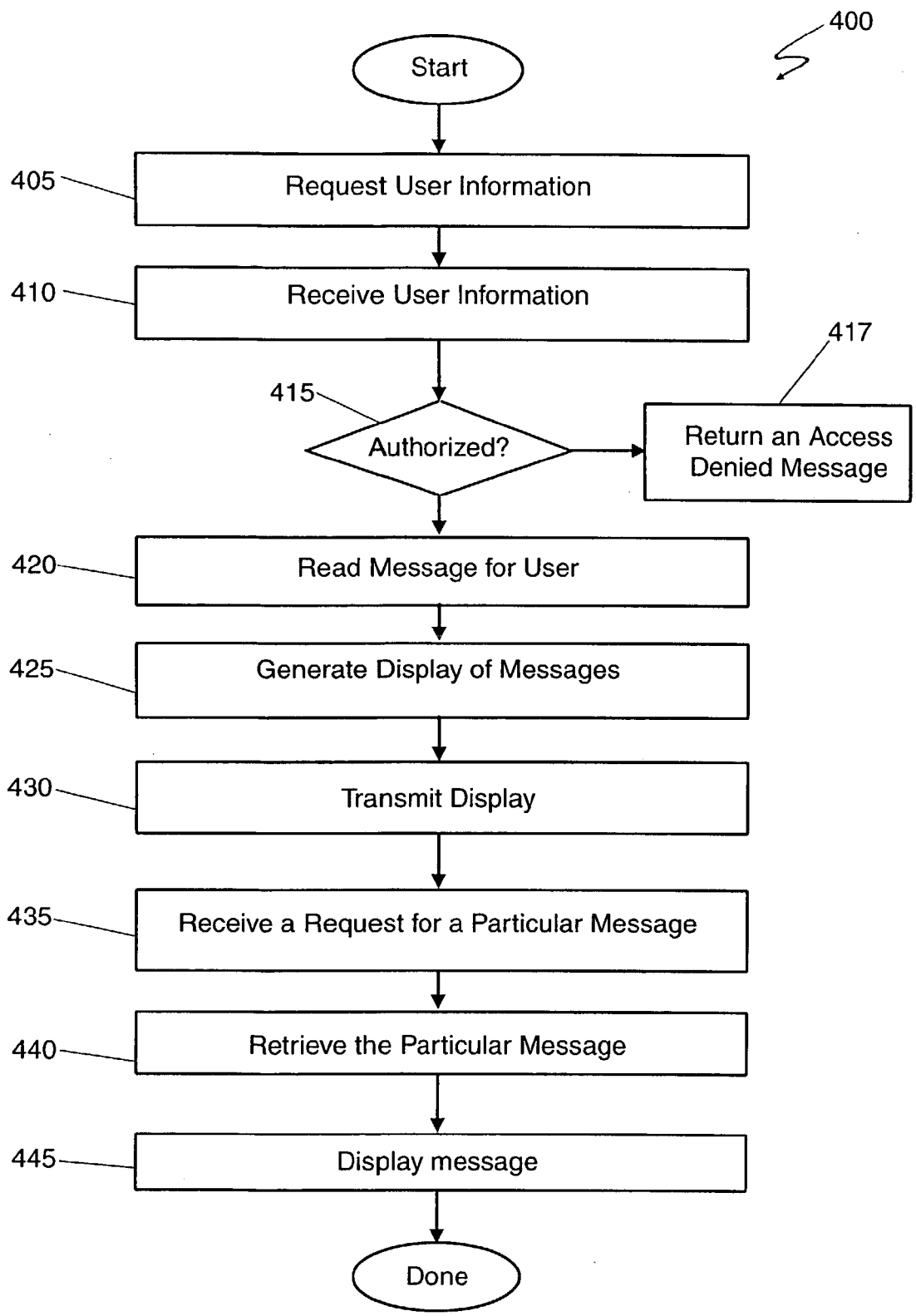
Figure 5:
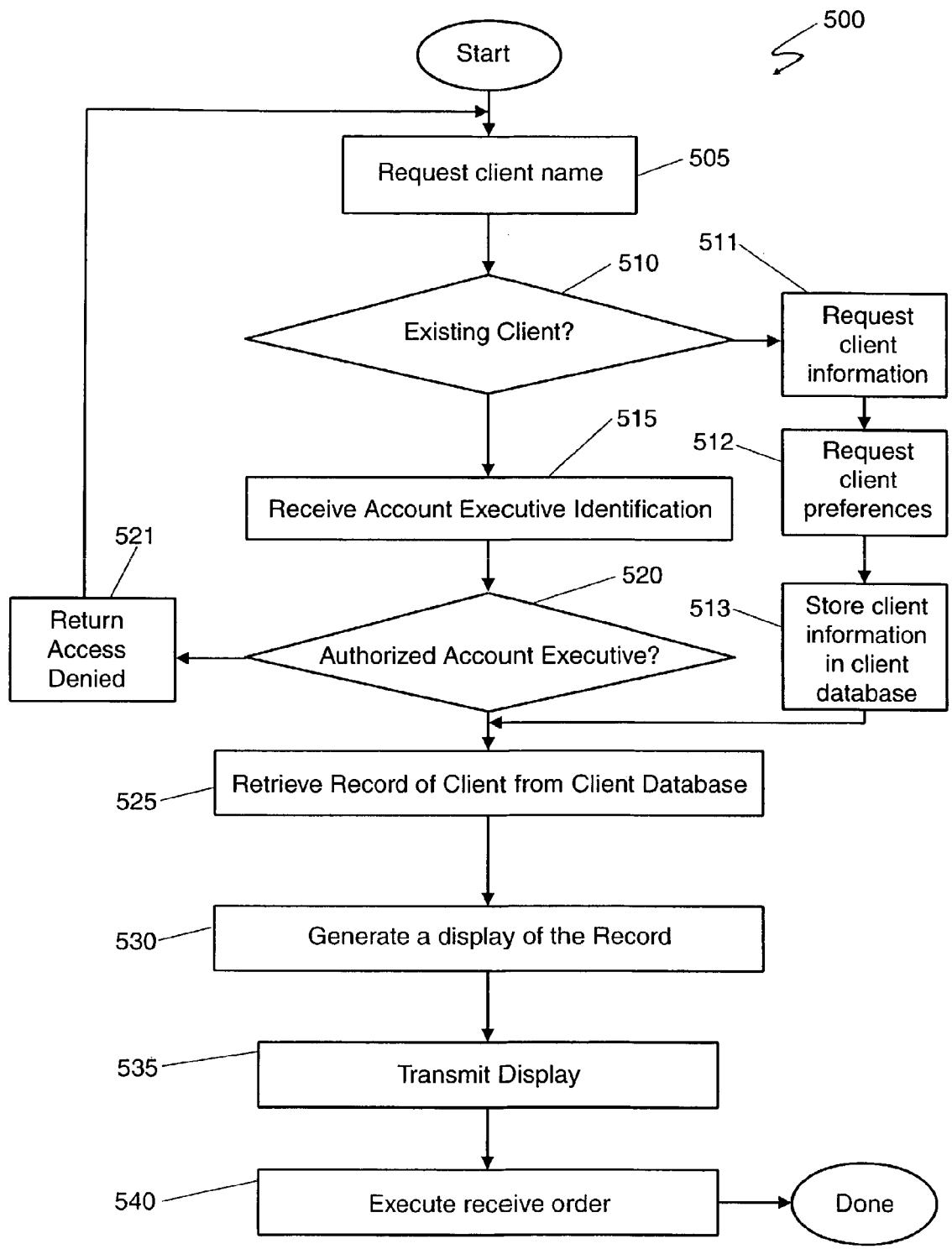
Figure 6:
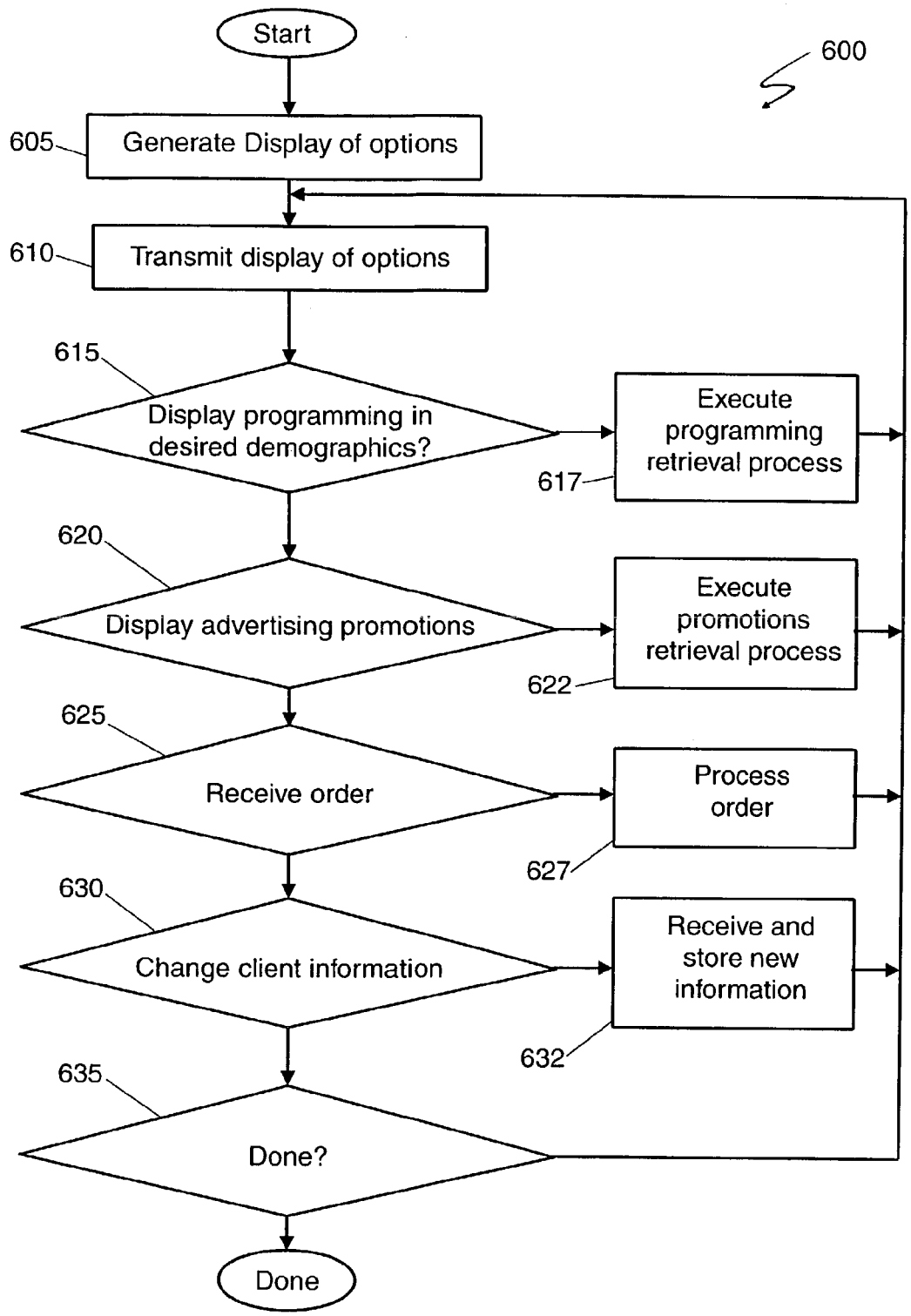
Figure 7:
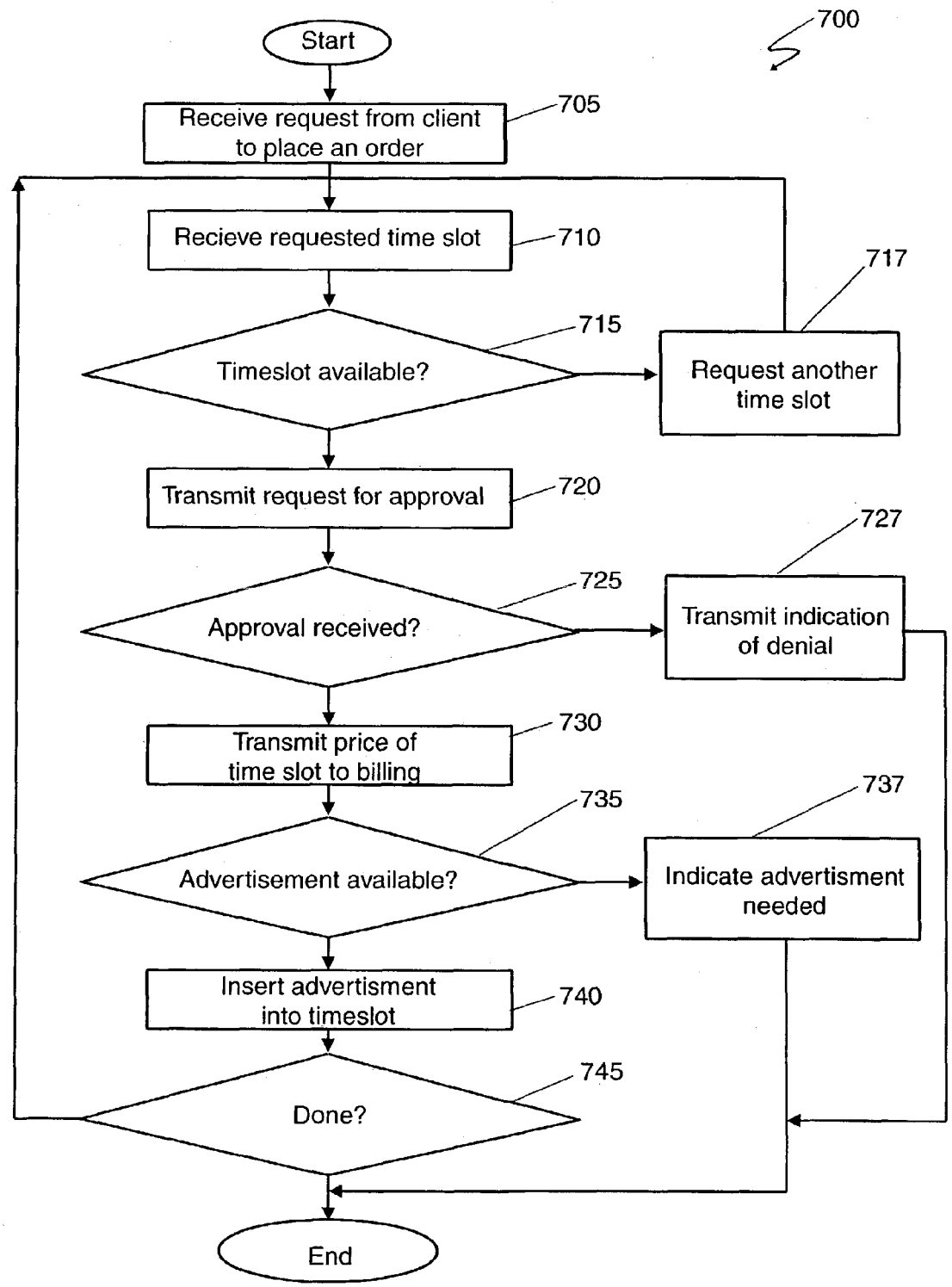
Figure 8:
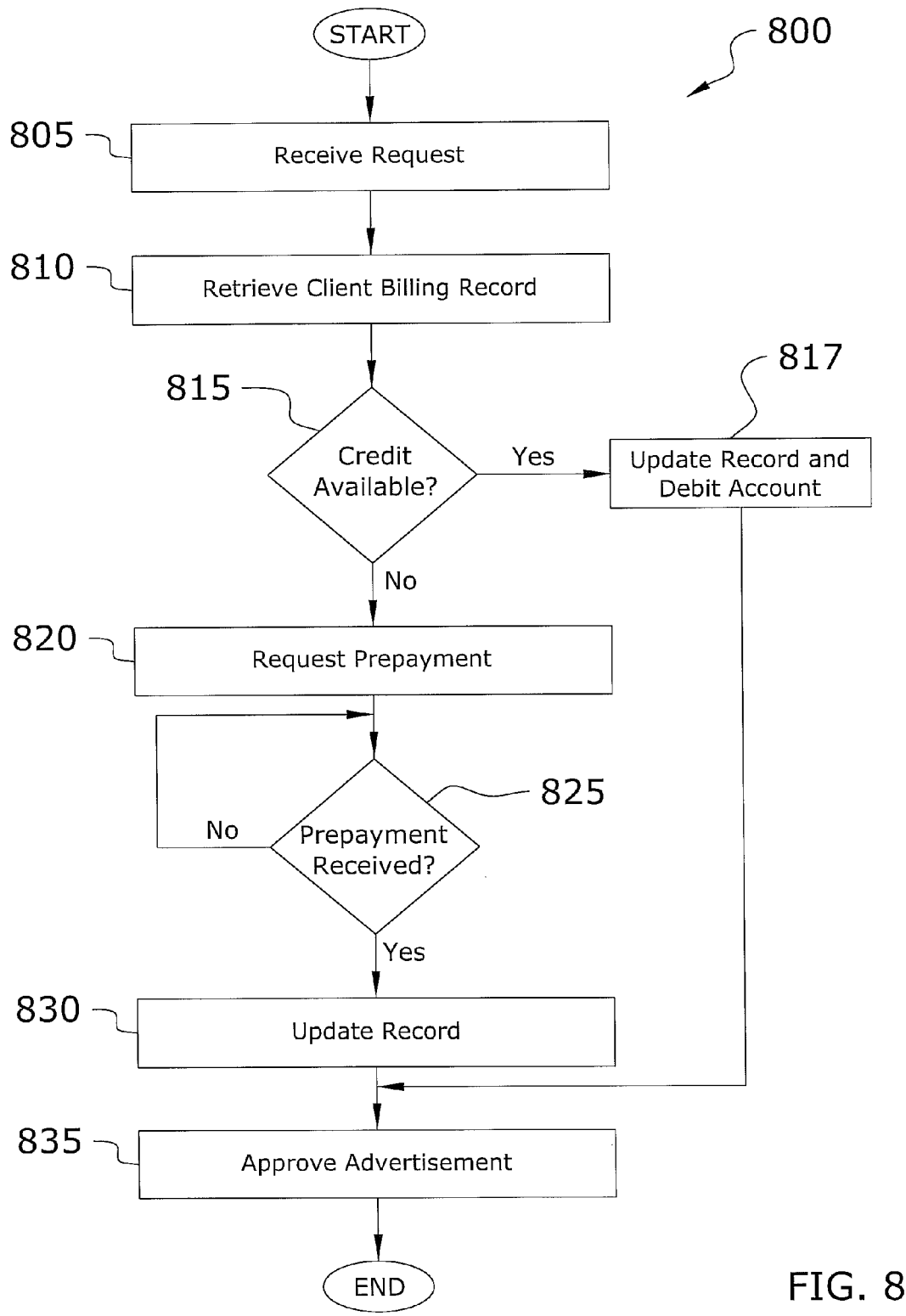
Figure 9:
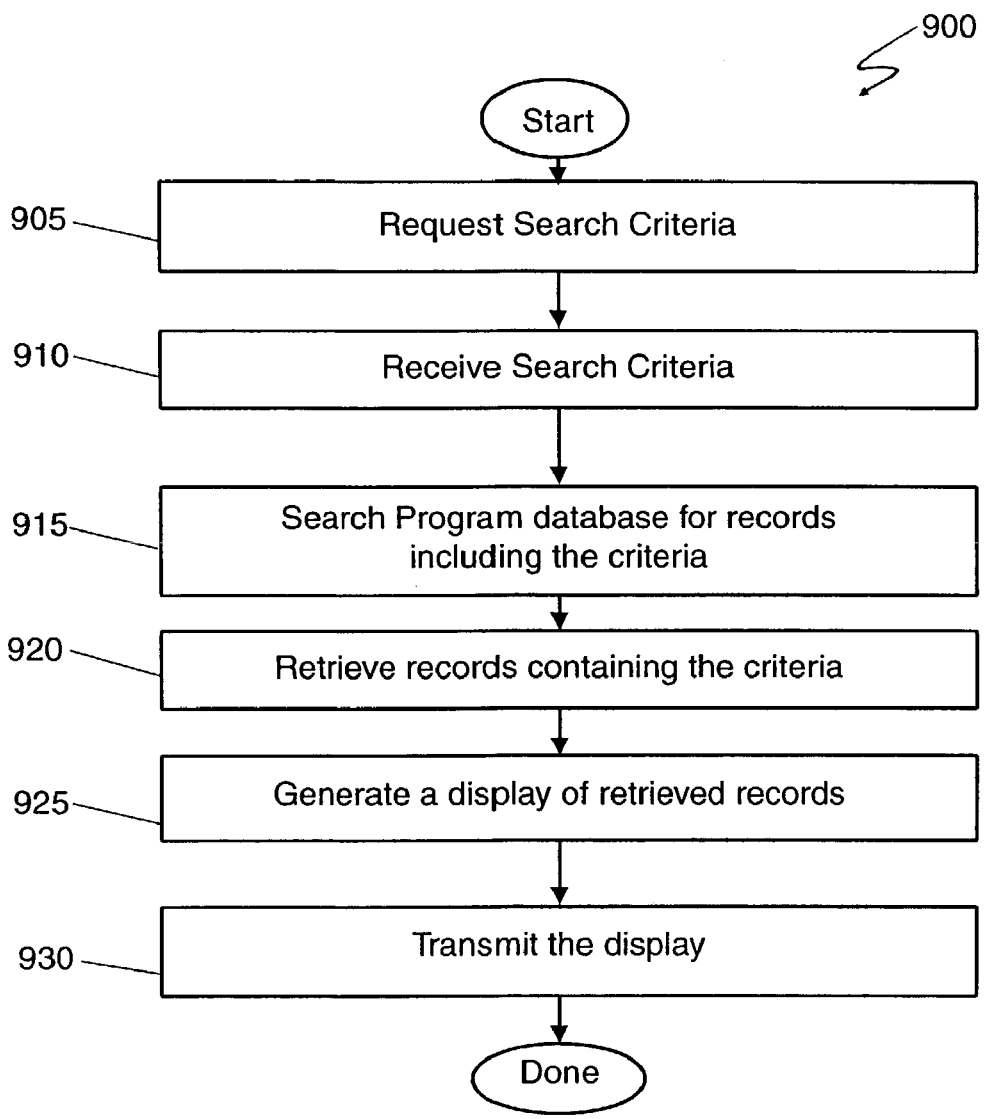
Figure 10:
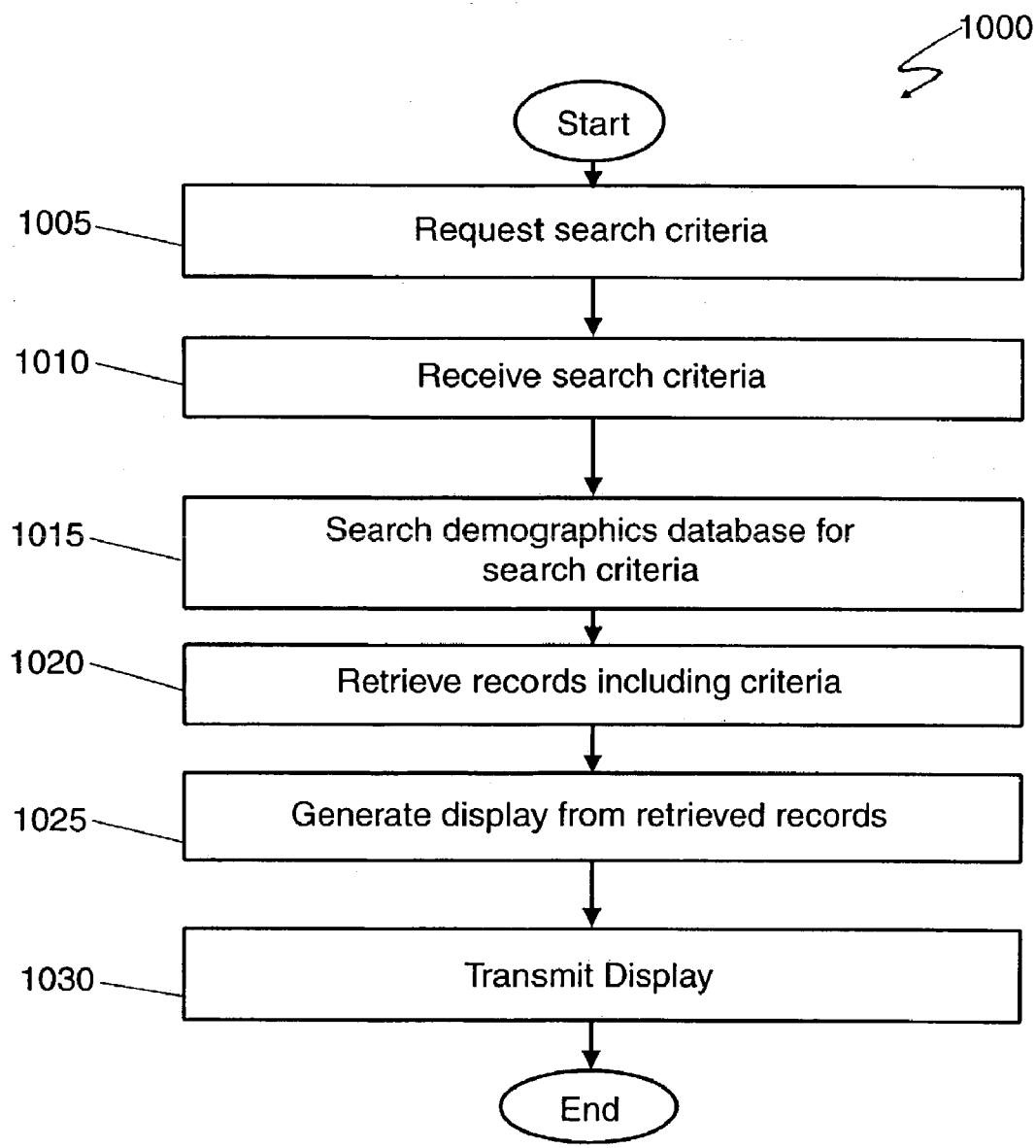
Figure 11:
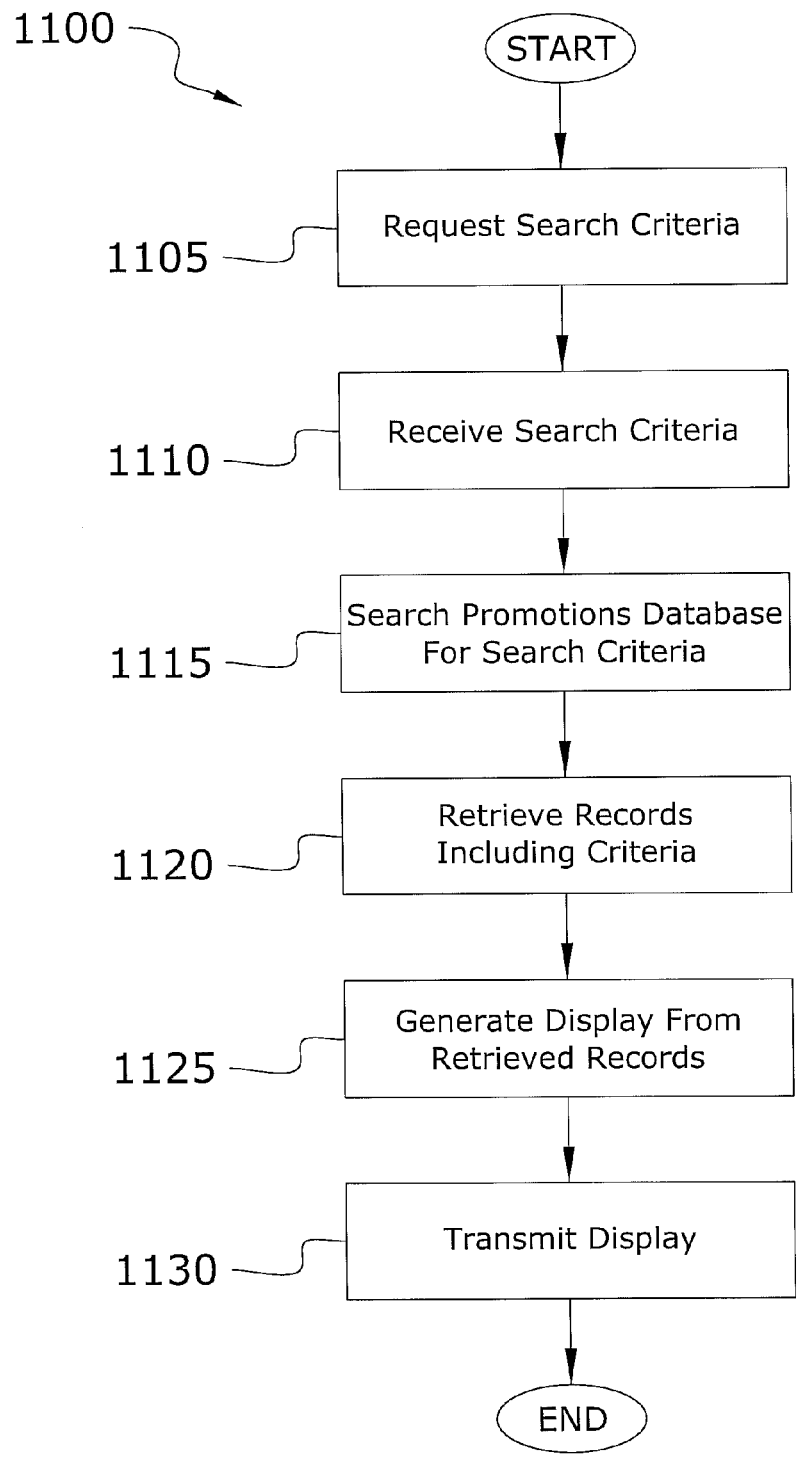
Figure 12:
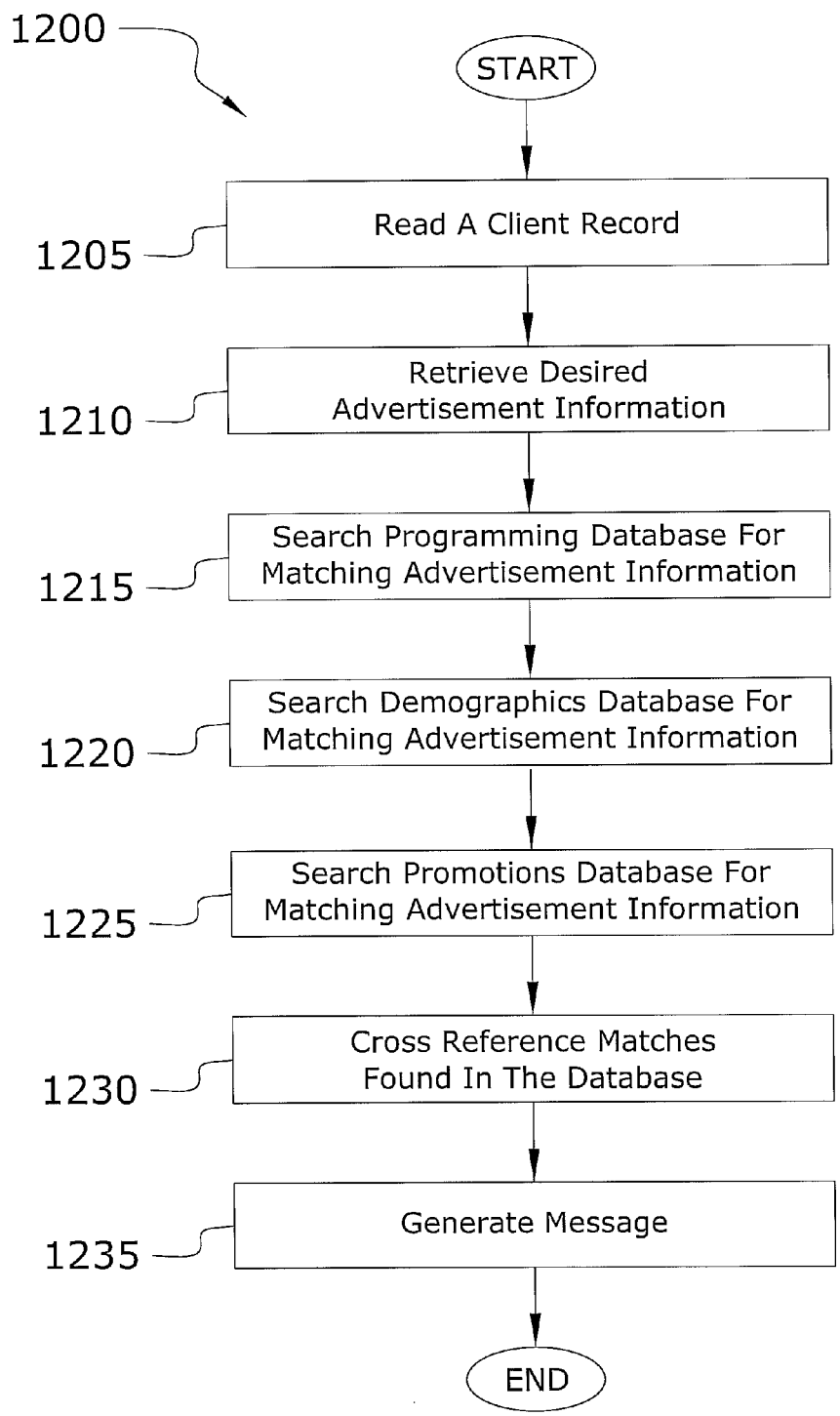
Figure 13:
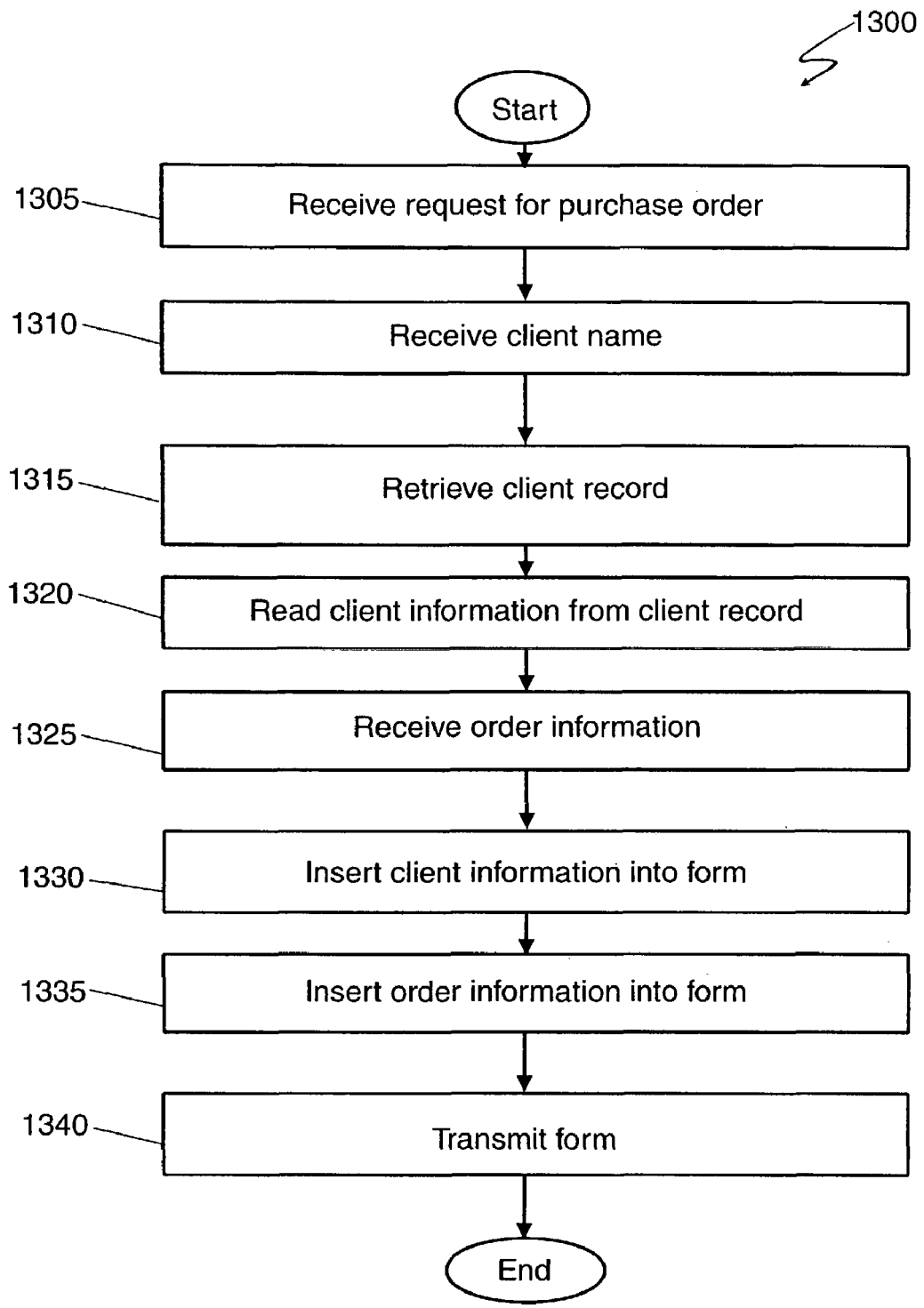

The above and other features of this invention are described in the following Detailed Description and shown in the following drawings:

FIG. 1 illustrating a computer network that provides a system in accordance with this invention;

FIG. 2 illustrating a processing unit in components of the network in accordance with this invention;

FIG. 3 illustrating a flow diagram of a process for providing an interface in accordance with this invention;

FIG. 4 illustrating a flow diagram of a process for accessing system messages in accordance with this invention;

FIG. 5 illustrating a flow diagram of a process for accessing data in a client database in accordance with this invention;

FIG. 6 illustrating a flow diagram of a process for providing options in a process for accessing the client database in accordance with this invention;

FIG. 7 illustrating a flow diagram of a process for processing an order in accordance with this invention;

FIG. 8 illustrating a flow diagram of a process for accessing a billing database in accordance with this invention;

FIG. 9 illustrating a flow diagram of a process for accessing information in a programming database in accordance with this invention;

FIG. 10 illustrating a flow diagram of a process for accessing information in a demographics database in accordance with this invention;

FIG. 11 illustrating a flow diagram of a process for accessing information in a promotion database in accordance with this invention;

FIG. 12 illustrating a flow diagram of a process for generating a purchase order in accordance with this invention; and FIG. 13 illustrating a process for periodically searching database for information of interest to a client in accordance with this invention.

DETAILED DESCRIPTION OF THE INVENTION

The following description of exemplary embodiments of the invention is not intended to limit the scope of the invention to these exemplary embodiments, but rather to enable any person skilled in the art to make and use the invention.

FIG. 1 illustrates a network 100 that provides an advertising system in accordance with this invention. Network 100 includes Internet or Intranet 101 that connects various processing systems in network 100 to allow the exchange of data between the processing systems. One skilled in the art will recognize that processing systems are personal computers, system computers, routers, or other devices that can process digital data.

In network 100, desktop computers 105-106 are connected to Internet/Intranet 101 via paths 107-108. Laptop computers 110-113 are connected to Internet/Intranet via paths 114-117. One skilled in the art will recognize that paths 107-108 and 114-117 may be telephone line, Ethernet lines, or any other manner of connecting processing systems. One skilled in the art will also recognize that any number of processing unit may be connected to Internet/Intranet 101.

Information server 121 is connected to Internet/Intranet 101 via path 122. Information server 121 is a router or other processing device that controls data transfers between processing systems connected to Internet/Intranet 101.

Database server 131 is connected to Internet/Intranet 101 via path 132. Database server is a processing system that maintains various databases that are accessed by this invention. In Network 100, database server 131 maintains programming database 133, promotions database 134, demographics database 135, client database 136, billing database 137, production database 139, inventory database 140 and message database 138.

Programming database 133 stores record for information about programs to be broadcast including time, length, and timeslots for advertisements. This information may compiled by an outside the provider and the compiled information is used to populate the database. Promotions database 134 stores records containing information relating to pricing for timeslots and special offers on sales of time slots. Demographics database 135 stores records containing information relates to ratings for broadcast programs and demographic information about viewers of the broadcast programs. Demographic information may come from another source. The demographics information from the other source may be used to populate demographics database 135.

Client database 136 is a database that stores client information. The client information stored in client database 136 includes client contact information, target areas for the client, demographic groups the client desire to reach, and desired rates for timeslots. The client information may also include past time slots that the client has purchased including the programming into which the timeslot is inserted. This information may either be provided by the client directly or an Account Executive may collect the information and input the information into the system.

Billing database 137 is a database that stores client account records that stores accounting information for sales of time slots. Billing database 137 may be a well known accounting application, or may be a custom made accounting application for use in the system in accordance with this invention.

Message database 138 is an e-mail or other message system that stores messages generated by the system for Account Executives. The messages may include reminders about promotions or programming that may be of interest to an Account Executive.

Production database 139 stores programming content to be broadcast. The programming content may include the insertions of advertisements into appropriate timeslots in the broadcast. Inventory database 140 may store the advertisements that various clients have produced for insertion into the programming content when a timeslot is purchased.

Network 100, may also have a printer 142 or other output device connected to Internet/Intranet 101 via path 141. Printer 142 prints either a screen or a document for permanent storage or for review by an Account Executive. Printer 142 is a standard printer that is common and well known in the art.

FIG. 2 illustrates an exemplary embodiment of a processing system 200. One skilled in the art will recognize that each device connected to network 100 in FIG. 1 includes a processing system. However, the exact configuration and device connected to the processing system in each individual device in the network may vary.

Processing system 200 has a Central Processing Unit (CPU) 201. CPU 201 is a processor, microprocessor, or any combination of processors and microprocessor that execute instructions stored in memory to perform an application. CPU 201 is connected to a memory bus 203 and Input/Output (I/O) bus 204.

A non-volatile memory, such as Read Only Memory (ROM) 211, is connected to CPU 201 via memory bus 203. ROM 211 stores instructions for initialization and other system commands of processing system 200. One skilled in the art will recognize that any memory that cannot be written to by CPU 201 may be used for the functions of ROM 211.

A volatile memory such as Random Access Memory (RAM) 212 is also connected to CPU 201 via memory bus 204. RAM 212 stores instructions for all processes being executed and data operated upon by the executed processes. One skilled in the art will recognize that other types of memories such DRAM and SRAM may also be used as a volatile memory and that memory caches and other memory devices (Not shown) may be connected to memory bus 204.

Peripheral devices including, but not limited to, memory 221, display 222, I/O device 223, and network connection device 224 that are connected to CPU 201 via I/O bus 204. I/O bus 204 carries data between the device and CPU 201. Memory 201 is a device for storing data unto a media. Some examples of memory 221 include read/write compact discs (CDs), and magnetic disk drives. Display 222 is a monitor or display and associated drivers that convert data to a display. I/O device 223 is a keyboard, a pointing device or other device that may be used by a user to input data. Network device 224 is a modem or Ethernet "card" that connects processing system 200 to a network. One skilled in the art will recognize that exact configuration and devices connected to each processing system in network 100 may vary depending upon the operations that the processing system performs in the network.

The present invention relates providing an integrated system for selling advertising time over a broadcast medium. In accordance with this invention, an interface is provided that may accesses the databases needed by an Account Executive to sell advertising over a broadcast medium. For purposes of this discussion, the broadcast medium may be broadcast programs for a single channel or station. Alternatively, the broadcast medium, may be a system that provides broadcasts for several stations or channels such as a cable television transmission in which multiple channels of programming content are broadcast by a provider. The interface may be provided by software executed by a processing system at a work station, such as a desktop or laptop computer, or may be executed by a server that is communication with a workstation over a network using a browser or other access software.

When an Account Executive logs into the system, the interface provides a display that will provide the Account Executive with the options available by the interface to the Account Executive. Preferably, the display is a "Windows" type display with activation "buttons" for each option. The user can then select an option by "clicking" on the activation button for the option using a pointing device such as a mouse. Alternatively, the interface may have various drop down menus that may be scrolled through to select an option.

FIG. 3 illustrates a flow diagram of a process 300 executed to provide the interface using the above described display. Process 300 begins in step 305 in which the display is generated by the processing unit in the processing system executing process 300. In step 310, the display is then transmitted. If the processing system is accessing process 300 via a network connection, the processing system executing process 300 transmits the display to the workstation of the Account Executive. Otherwise, the display is transmitted to the display device of the processing system. One skilled in the art will recognize that different instructions are needed to generate the display depending on which device receives the display.

In step 315, process 300 receives a request for an option to be performed. The option may either be received as a request from a workstation or as an input into the processing system depending upon how the interface is being executed. For example, the request may be a "click" on a "button" of the screen if the processing system is directly performing the process or a request message generated by a workstation in response to a click on a button on the display of the workstation if a workstation is connected to the processing system executing process 300.

Process 300 then determines which option was requested. In step 325, process 300 determines whether a retrieve message request was received. If a retrieve message request was received, process 300 performs a retrieve message process in step 327 and then process 300 returns to steps 315 to receive another option. Otherwise, process 300 continues to step 330.

In step 330, process 300 determines whether a request to access client records is received. If a client access request is received, a client record lookup in the client database is performed in step 332 and then process 300 returns to step 315 to receive another option. Otherwise, process 300 continues to step 335.

In step 335, process 300 determines whether an access programming data request was received. If an access programming data request is received, process 300 performs a programming look-up process in step 337 and then returns to step 315 to receive another option. Otherwise, process 300 continues to step 340.

In step 340, process 300 determines whether an access promotion request was received. If an access promotion request was received, process 300 performs a promotion look-up process in step 342 and then returns to step 315 to receive another request. Otherwise process 300 continues to step 345.

In step 345, process 300 determines whether a quit or exit command is received. If a quit request is received process 300 ends. Otherwise process 300 returns to 315 to receive another option.

FIG. 4 illustrates a flow diagram of a process 400 for retrieving messages for an Account Executive that are stored in a message database. One skilled in the art will recognize that message database may be a custom designed database or a standard e-mail system that may be incorporated into the system of the present invention.

Process 400 begins in step 405 by transmitting a display requesting user information. In step 410, the user information is received by process 400. The information may be received from either a direct input or from a message from another system. In step 415, process 400 retrieves a user record for the identified user and determines whether the user is authorized to receive the messages. The check for user authorization may be a password comparison or other means comparable means. If the user is not authorized, process 400 generates a process denied message that is either transmitted to another system or displayed to the user in step 417. Process 400 then ends.

If the user is authorized, process 400 reads messages for the user from a message database in step 420. In step 425, process 400 generates a display of the messages. The display may be a list of messages, the full messages or some other manner of showing contents of messages. Furthermore, the display may include options for retrieving individual messages or other options for messages, such as typical e-mail functions including replies and forwarding.

The display is then transmitted either to a display device or another system in step 430. In step 435, a request to view a particular message is received. The particular message is then retrieved in step 440. A display of the message is generated in step 445. The display is then transmitted to the display device or other processing system. Process 400 then ends or may continue waiting to receive a request for another message.

FIG. 5 illustrates a process 500 performed when access to information in a client database such as in step 332 of process 300. Process 500 begins in step 505 by generating a display requesting a client name. After the client name is received, process 500 determines whether there is a record for the client as shown in step 510. This is preferably completed by searching records in the client database for a record having a matching client name. If the client does not have an existing record, process 500 may generate a new client record for the client beginning in step 511. In step 511, process 500 generates a display that requests new client information. Preferably, the display is a template having fields that correspond to fields in a client record. The Account Executive may then either print the form and poll the client or directly input the information into the fields. The fields in the form may include client billing information, client contact, client preferences for time slots and other information that may aid in the selling of timeslots in a broadcast to a client.

In step 512, process 500 receives the client information. The information may either be received as message from a client machine or as direct input from the user. In step 513, process 500 stores the client information in a record in the client database.

If a client record is determined to exist in step 510, process 500 requests Account Executive information in step 515. The Account Executive information is then checked to determine whether the Account Executive is authorized to access the client information in step 520. The Account Executive information may be a password that is compared to a stored password for the Account Executive. The client record may also store an authorized Account Executive name that is compared to the name of the Account Executive. If the Account Executive is not authorized to access the client information an access denied display is transmitted in step 521 and process 500 returns to step 505 to receive another client name.

If an Account Executive is authorized in step 520 or after step 513, process 500 retrieves the client record for the client in step 525. A display of the client record information is then generated in step 530. The display is then transmitted to either a display device or to a workstation in step 535. The display may include a list of options for processes that may be executed while access the client database. In step 540, requests for options are received and executed. Process 500 then ends.

Process 600 illustrated in FIG. 6 is a process executed in accordance with this invention for providing options from a client database. Process 600 begins in step 605 with the display of the client record information including a list of options of process to execute. The options may be active "buttons" in a display or may be a drop down menu. The display of the options is transmitted in step 610. A request for an option is then received.

In step 615, process 600 determines whether the request is for information from the demographics database. If so, process 600 executes a demographics information look-up in the demographics database in step 617. Otherwise process 600 continues to step 620.

In step 620, process 600 determines whether a request is received for promotion information. If the request is for promotion information, process 600 performs a promotions database look-up in step 622. Otherwise, process 600 continues to step 625.

In step 625, process 600 determines whether a receive order request is received. If a receive order request is received, process 600 executes a process for receiving an order in step 627. Otherwise, process 600 continues to step 630.

In step 630, process 600 determines whether a change client information request is received. In step 632, the new client information is received and stored in the client record of the client database, Otherwise process 600 continues to step 635.

In step 635, process 600 determines whether a request to complete the client record access is received. If so, process 600 ends. Other process 600 returns to step 615 to receive another request.

Process 700 illustrated in FIG. 7 is a process for receiving an order of a time slot for a user. Process 700 begins in step 705 by receiving a request to place an order for a client. In step 710, the timeslot requested is received. One skilled in the art may note that the timeslot to buy may be included in the request.

In step 715, process 700 determines whether the time slot is available. If the time slot is not available, process 700 requests another time slot in step 717 and repeats step 715. If the time slot is available, process 700 transmits a request for approval in step 720. The request may be transmitted as a request for a billing system look-up of the client to determine whether the client may be charged or has paid. Alternatively, the request may be transmitted as a message or e-mail, to a supervisor that can provide the requested approval.

In step 725, process 700 determines whether approval is received. If approval is not received, process 700 transmits a denial in step 727 and process 700 ends. Otherwise, process 700 transmits a request to a billing system to update the client's account to charge for the timeslot. In step 735, process 700 determines whether the client has an advertisement available for broadcast. Step 735 may include a search of an inventory database for an advertisement that the client has provided for use in purchased time slots. If the client has an advertisement available, the advertisement is then placed into the broadcast material in step 740. Step 740 may be completed by adding the advertisement to broadcast content stored in a production database. Otherwise, an indicator that an advertisement for the client needs to be inserted is placed in the broadcast material.

After the indicator or the advertisement is inserted, process 700 determines whether another time slot needs to be purchased in step 745. If so, process 700 repeats from step 710. Other process 700 ends.

Process 800 illustrated in FIG. 8 illustrates a process for accessing a billing record. This process is executed during the processing of an order in step 730 of process 700. Process 800 begins in step 805 when a request to access billing is received. The request includes the client name or other account information of the client whose record is to be accessed. In step 810, process 800 retrieves the billing record for the requested client. This record can be retrieved from the client information received in the request.

In step 815, process 800 determines whether the client has credit available. This may be done by checking a field that indicates approval for credit or by checking the balance of the client's account to determine whether there is credit in the account. If there is credit available, the client account is updated in step 817 by debit for a time slot purchased and process 800 continues to step 835.

If the client does not have credit, process 800 requests prepayment in step 820, this may be done by providing an e-mail or other message to the client or by allowing the input of an electronic account such as a credit card number. In step 825, payment is received. The client record is then updated in step 830. The advertisement is then approved in step 835. One skilled in the art will recognize step 835 may be skipped if approval of an advertisement is not needed from the billing system. Process 800 ends after step 835.

Process 900 illustrated in FIG. 9 is a process for accessing information in a programming database when a look-up in the programming database is requested. Process 900 begins in step 905 by requesting search criteria. The request may be a display having a form with fields of the database that allow a user to input the desired data for that field. The search criteria may include a type of programming, certain time slots, a certain broadcast area or any other identifying information. In step 910, the search criteria is received.

In step 915, the programming database is searched for records that match the requested criteria. In step 920, the records matching the search criteria are retrieved. A display is then generated from the retrieved records in step 925. The display is typically a grid format displaying the requested programming. The display is then transmitted to a display device or to a workstation of the user in step 930. Process 900 then ends.

Process 1000 illustrated in FIG. 10 is a process for accessing information in a demographics database when a look-up in the programming database is requested. Process 1000 begins in step 1005 by requesting search criteria. The request may be a display having a form with fields of the database that allow a user to input the desired data for that field. The search criteria may include a type of programming, certain time slots, certain broadcast areas, ages or other information about viewers or listeners of a broadcast. In step 1010, the search criteria is received.

In step 1015, the demographics database is searched for records that match the requested criteria. In step 1020, the records matching the search criteria are retrieved. A display is then generated from the retrieved records in step 1025. The display is typically a grid or chart format displaying the requested demographic information. The display is then transmitted to a display device or to a workstation of the user. Process 1000 then ends.

Process 1100 illustrated in FIG. 11 is a process for accessing information in a promotion database when a look-up in the programming database is requested. Process 1100 begins in step 1105 by requesting search criteria. The request may be a display having a form with fields of the database that allow a user to input the desired data for that field. The search criteria may include a type of programming, certain time slots, certain broadcast areas, pricing, demographics or any other identifying information for promotions. In step 1110, the search criteria is received.

In step 1115, the promotions database is searched for records that match the requested criteria. In step 1120, the records matching the search criteria are retrieved. A display is then generated from the retrieved records in step 1125. The display is typically a grid format or other format displaying the promotions matching the search criteria. The display is then transmitted to a display device or to a workstation of the user. Process 1100 then ends.

Process 1200 illustrated in FIG. 12 is a process that periodically reads client information and looks for sales opportunity for client. Process 1200 begins in step 1205 by reading a client record. In step 1210, the desired demographics, type of programming, desired area, pricing, and desired times of a client are read from the client record. In step 1215, a programming look-up is performed for finding programming that matches the clients preferences. In step 1220, a demographic database look-up is performed to find demographics that of programming matching the client preferences. In step 1225, the promotions database is searched for promotions that meet the client preferences. In step 1230, the retrieved records from the look-ups are then cross-referenced to generate a list of sales opportunities for the client. A message including the list is then generated and transmitted in step 1235. The message may either be transmitted to the Account Executive handling the client or directly to a client contact. The message may include a link or some way for the client to select a choice for buying advertising. After the message is transmitted, process 1200 ends.

Process 1300 illustrated in FIG. 13 is a process for generating a purchase order when a client purchases a time slot. Process 1300 is executed after the time slot is purchased to print a purchase order or contract for the purchase. Process 1300 begins in step 1305 in which a request for a purchase order for a client is received. In step 1310, the client name is received. One skilled in the art will note that the client name and time slot sold may be included in the request.

In step 1315, the client record of the client is retrieved. Client information is then read from the client record. The client information is then inserted into proper fields of a form in step 1320. For example, a client address is inserted into the address field, etc. The order information including the timeslot and sales price is then received in step 1325. The form is then transmitted either to the workstation of the Account Executive or may be sent in a message to the client.

A purchase order is then generated from the received information. In step 1330, the client information is placed in the proper fields of a purchase order form. The order information including the timeslot and sales price of the time slot are then inserted into the form in step 1335. The form is then transmitted to the display, client workstation, or to a processing system of the client.

As any person skilled in the art will recognize from the previous description and from the figures and claims, modifications and changes can be made to the preferred embodiments of the invention without departing from the scope of the invention defined in the following claims.

What is claimed is:

1. A computer system for selling and allocating advertising time slots for a broadcast media, the system comprising:
    a processor, the processor being a hardware component of the computer system; and
    a memory in communication with the processor, the memory storing a plurality of instructions that when executed by the processor, execute the steps of:
    providing an interface application, displayed on an electronic device, said interface having selectable options including at least an option to access message data, an option to access client data, an option to access programming data and an option to place an order;
    in response to a user selection, via an electronic input device, of the option to access message data, searching a message database, where said message database stores messages generated by the management system;
    in response to a user selection, via the electronic input device, of the option to access client data, accepting a client identifier, searching a client database for matching client information and displaying said matching client information, said matching client information including client contact information, desired areas for the client, desired time slots, demographic information of target groups for the client, type of programming, desired rates for the desired time slots and desired advertisement information;
    in response to a user selection, via the electronic input device, of the option to access programming data, searching a programming database based at least in part on the type of programming and retrieving matching programming information from said programming database, said matching programming information including at least one available advertising time slot, and displaying said at least one available advertising time slot and corresponding parameters;
    in response to a user selection, via the electronic input device, of the option to place an order, placing an order for the at least one advertising time slot for the client, approving said request to place an order, in response to said approval, adding at least one advertisement from said client database for insertion into said programming information, and in response to said adding, billing the client for the selected time slot.

2. The system of claim 1, wherein said selectable options further include an option to access promotions data.

3. The system of claim 2, wherein, in response to a user selection of the option to access promotion data, searching a promotions database, retrieving promotions information for searching said promotions database for matching advertisement information, cross referencing said matches found in said client database and said programming database and generating a message to said client containing a list of sales opportunities for said client.

4. The system of claim 3, further comprising reading a client record from said client database, retrieving desired advertisement information, searching said programming database for matching advertisement information comprised of said programming information and said demographic information of said broadcast media, searching said promotions database for matching advertisement information, cross referencing said matches found in said databases and generating a message to said client containing a list of sales opportunities for said client.

5. The system of claim 1, further comprising receiving a request for a time slot for an advertisement, determining whether said time slot is available, transmitting a charge for said time slot to a billing system, and inserting a desired advertisement into said programming information.

6. The system of claim 5, further comprising determining whether said time slot is available.

7. The system of claim 6, further comprising requesting an input of a second time slot in response to a determination that said time slot is not available.

8. The system of claim 5, further comprising transmitting a request to approve said time slot for said client and receiving an approval for said time slot, and wherein inserting said advertisement into said time slot is responsive to receiving said approval.

9. The system of claim 5, further comprising transmitting a time slot denied message responsive to not receiving said approval.

10. The system of claim 5, further comprising determining whether an advertisement for said client is available, and wherein said inserting of said advertisement into said time slot said programming is responsive to said advertisement being available.

11. The system of claim 1, further comprising accessing a billing database that maintains an accounting system in said program storage device for charging clients for advertising time during a broadcast of programming.

12. The system of claim 1, further comprising receiving a request to bill a client for time slot, retrieving a billing record for said client, and updating said billing record to debit said client for said time slot.

13. The system of claim 1, further comprising determining whether said client is approved for credit, and wherein said updating of said billing record to debit said client is responsive to a determination said client is approved for credit.

14. The system of claim 13, further comprising requesting payment responsive to a determination that said client is not approved for credit, receiving said payment, and wherein said updating of said record is responsive to receiving said payment.

15. A computer readable medium with program instructions tangibly stored thereon for selling and allocating advertising time slots for a broadcast media, the program instructions comprising instructions for:
    providing an interface application, displayed on an electronic device, said interface having selectable options including at least an option to access message data, an option to access client data, an option to access programming data and an option to place an order;
    in response to a user selection, via an electronic input device, of the option to access message data, searching a message database, where said message database stores messages generated by the management system;

in response to a user selection, via the electronic input device, of the option to access client data, accepting a client identifier, searching a client database for matching client information and displaying said matching client information, said matching client information including client contact information, desired areas for the client, desired time slots, demographic information of target groups for the client, type of programming, desired rates for the desired time slots and desired advertisement information;

in response to a user selection, via the electronic input device, of the option to access programming data, searching a programming database based at least in part on the type of programming and retrieving matching programming information from said programming database, said matching programming information including at least one available advertising time slot, and displaying said at least one available advertising time slot and corresponding parameters;

in response to a user selection, via the electronic input device, of the option to place an order, placing an order for the at least one advertising time slot for the client, approving said request to place an order, in response to said approval, adding at least one advertisement from said client database for insertion into said programming information, and in response to said adding, billing the client for the selected time slot.

16. The computer readable medium of claim 15 further comprising instructions wherein said selectable options further include an option to access promotions data.

17. The computer readable medium of claim 16 further comprising instructions wherein, in response to a user selection of the option to access promotion data, searching a promotions database, retrieving promotions information for searching said promotions database for matching advertisement information, cross referencing said matches found in said client database and said programming database and generating a message to said client containing a list of sales opportunities for said client.

18. The computer readable medium of claim 17 further comprising instructions for reading a client record from said client database, retrieving desired advertisement information, searching said programming database for matching advertisement information comprised of said programming information and said demographic information of said broadcast media, searching said promotions database for matching advertisement information, cross referencing said matches found in said databases and generating a message to said client containing a list of sales opportunities for said client.

19. The computer readable medium of claim 15 further comprising instructions for receiving a request for a time slot for an advertisement, determining whether said time slot is available, transmitting a charge for said time slot to a billing system, and inserting a desired advertisement into said programming information.

20. The computer readable medium of claim 19 further comprising instructions for determining whether said time slot is available.

21. The computer readable medium of claim 20 further comprising instructions for requesting an input of a second time slot in response to a determination that said time slot is not available.

22. The computer readable medium of claim 19 further comprising instructions for transmitting a request to approve said time slot for said client and receiving an approval for said time slot, and wherein inserting said advertisement into said time slot is responsive to receiving said approval.

23. The computer readable medium of claim 19 further comprising instructions for transmitting a time slot denied message responsive to not receiving said approval.

24. The computer readable medium of claim 19 further comprising instructions for determining whether an advertisement for said client is available, and wherein said inserting of said advertisement into said time slot said programming is responsive to said advertisement being available.

25. The computer readable medium of claim 15 further comprising instructions for accessing a billing database that maintains an accounting system in said program storage device for charging clients for advertising time during a broadcast of programming.

26. The computer readable medium of claim 15 further comprising instructions for receiving a request to bill a client for time slot, retrieving a billing record for said client, and updating said billing record to debit said client for said time slot.

27. The computer readable medium of claim 15 further comprising instructions for determining whether said client is approved for credit, and wherein said updating of said billing record to debit said client is responsive to a determination said client is approved for credit.

28. The computer readable medium of claim 27 further comprising instructions for requesting payment responsive to a determination that said client is not approved for credit, receiving said payment, and wherein said updating of said record is responsive to receiving said payment.

29. A method for providing an advertising sales database management system for selling and allocating advertising time slots for a broadcast media, said method comprising:
providing an interface application, displayed on an electronic device, said interface having selectable options including at least an option to access message data, an option to access client data, an option to access programming data and an option to place an order;

in response to a user selection, via an electronic input device, of the option to access message data, searching a message database, where said message database stores messages generated by the management system;

in response to a user selection, via the electronic input device, of the option to access client data, accepting a client identifier, searching a client database for matching client information and displaying said matching client information, said matching client information including client contact information, desired areas for the client, desired time slots, demographic information of target groups for the client, type of programming, desired rates for the desired time slots and desired advertisement information;

in response to a user selection, via the electronic input device, of the option to access programming data, searching a programming database based at least in part on the type of programming and retrieving matching programming information from said programming database, said matching programming information including at least one available advertising time slot, and displaying said at least one available advertising time slot and corresponding parameters;

in response to a user selection, via the electronic input device, of the option to place an order, placing an order for the at least one advertising time slot for the client, approving said request to place an order, in response to said approval, adding at least one advertisement from said client database for insertion into said programming information, and in response to said adding, billing the client for the selected time slot.

30. The method of claim 29, wherein said selectable options further include an option to access promotions data.

31. The method of claim 30, further comprising, in response to a user selection of the option to access promotion data, searching a promotions database, retrieving promotions information for searching said promotions database for matching advertisement information, cross referencing said matches found in said client database and said programming database and generating a message to said client containing a list of sales opportunities for said client.

32. The method of claim 31 further comprising reading a client record from said client database, retrieving desired advertisement information, searching said programming database for matching advertisement information comprised of said programming information and said demographic information of said broadcast media, searching said promotions database for matching advertisement information, cross referencing said matches found in said databases and generating a message to said client containing a list of sales opportunities for said client.

33. The method of claim 29, further comprising receiving a request for a time slot for an advertisement, determining whether said time slot is available, transmitting a charge for said time slot to a billing system, and inserting a desired advertisement into said programming information.

34. The method of claim 33, further comprising determining whether said time slot is available.

35. The method of claim 34, further comprising requesting an input of a second time slot in response to a determination that said time slot is not available.

36. The method of claim 33, further comprising transmitting a request to approve said time slot for said client and receiving an approval for said time slot, and wherein inserting said advertisement into said time slot is responsive to receiving said approval.

37. The method of claim 33, further comprising transmitting a time slot denied message responsive to not receiving said approval.

38. The method of claim 33, further comprising determining whether an advertisement for said client is available, and wherein said inserting of said advertisement into said time slot said programming is responsive to said advertisement being available.

39. The method of claim 29, further comprising accessing a billing database that maintains an accounting system in said program storage device for charging clients for advertising time during a broadcast of programming.

40. The method of claim 29, further comprising receiving a request to bill a client for time slot, retrieving a billing record for said client, and updating said billing record to debit said client for said time slot.

41. The method of claim 29, further comprising determining whether said client is approved for credit, and wherein said updating of said billing record to debit said client is responsive to a determination said client is approved for credit.

42. The method of claim 41, further comprising requesting payment responsive to a determination that said client is not approved for credit, receiving said payment, and wherein said updating of said record is responsive to receiving said payment.

* * * * *